April 28, 1959     M. GOODMAN     2,883,780
PARKING STATION
Filed Aug. 27, 1957

INVENTOR.
MORRIS GOODMAN,
BY
Harold B. Hood,
ATTORNEY.

United States Patent Office 2,883,780
Patented Apr. 28, 1959

2,883,780

PARKING STATION

Morris Goodman, Indianapolis, Ind.

Application August 27, 1957, Serial No. 680,489

12 Claims. (Cl. 39—6)

The present invention relates to a vehicle parking station mechanism which, when installed in multiple units in a parking area, will substantially reduce the cost of operation of such an area. Through the use of stations in accordance with the present invention, such an area can be operated without the usual ticketing, substantially without the employment of attendants and without the necessity for calculating individual parking fees or manually collecting such fees.

The primary object of the invention, then, is to provide mechanism which will do away with the necessity for carrying out such services. More particularly, it is an object of the invention to provide mechanism by which, when a vehicle is parked by its operator, the vehicle will be held captive until an automatically calculated fee has been deposited in a coin-controlled automatic timer, whereupon the vehicle will be released for removal from the parking space. It is a further object of the invention to provide automatically operating means which will prevent a vehicle operator from satisfying the meter, after a short time, to release his vehicle for removal, and then leaving the vehicle in place for a further period before removing it without payment of a further fee.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
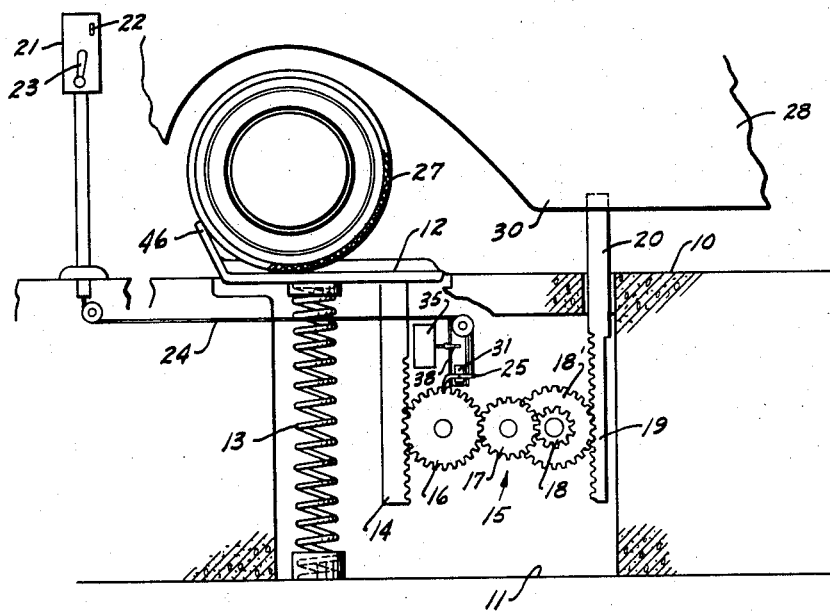
Fig. 1 is a somewhat diagrammatic illustration of mechanism constructed in accordance with the present invention, including a fragmentary illustration of a vehicle in captive condition.

In the drawings, the reference numeral 10 indicates a floor, street, parking lot surface, or the like which, for each vehicle parking station, will be provided with a pit 11. Overlying the pit is a platform 12 constructed and arranged to support at least one wheel of a vehicle to be parked, and said platform is yieldably supported, as by a spring or springs 13, normally in an elevated position which may be either slightly above, or flush with, the surface 10. The platform and its support are so designed that, when a wheel of a vehicle is supported thereon, the spring means will yield sufficiently to permit the platform to be depressed to a lower position.

A barrier 20 is mounted for vertical reciprocation into and out of the path of movement of a wheel of a vehicle which has a wheel supported on the platform 12. Means is provided to establish a driving connection between the platform 12 and the barrier 20 so that, when the platform 12 occupies its unloaded, elevated position, the barrier will be retracted into the pit 11 to permit free movement of a vehicle wheel onto or away from the platform; but when the platform is depressed, the barrier 20 will be elevated into the path of such a wheel. Obviously, it is not important whether or not the barrier is disposed in the path of the same wheel which is supported on the platform 12.

In the illustrated embodiment of the invention, the operative connection between the platform 12 and the barrier 20 comprises a rack 14 fixed to the platform 12, a distance-multiplying gear train, indicated generally by the reference numeral 15, and a rack 19 fixed to the barrier 20. As shown, the gear train 15 comprises a gear 16 meshing with rack 14, a gear 17 meshing with the gear 16, a gear 18 meshing with the gear 17, the several gears being of successively reduced pitch diameter, and a pinion 18' fixed to rotate with gear 18, preferably having a pitch diameter substantially equal to that of the gear 16 and meshing with the rack 19. The gear train illustrated will, of course, produce upward movement of the barrier 20 in response to downward movement of the platform 12 and downward movement of the barrier in response to upward movement of the platform, and will move the barrier through a stroke longer than the stroke of the platform.

Figure 4:
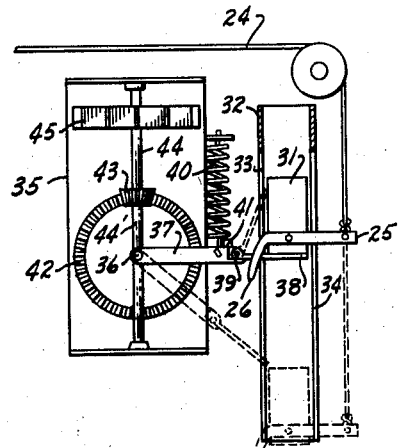
Fig. 4 is an enlarged view of the detent mechanism and the time-delay feature, forming a part of the present invention.

A conventional timing meter 21 is located adjacent the platform 12 and is so constructed and arranged that, when the platform 12 is depressed, the timer mechanism will go into operation. The meter, which is of well known construction, is provided with a coin-receiving slot 22 and acts to lock a lever 23 against manipulation until a sum of money determined by the timing mechanism is deposited in the slot 22. Upon deposit of the time-determined sum, the handle 23 is released for actuation; and said handle is connected, by a cable 24, to lift a pawl 25 out of restraining engagement with an element such as 16 of the gear train 15. As is illustrated in Figs. 1 and 4, the pawl 25 is formed with a nose 26 which, under normal conditions, engages the teeth of the gear 16 to hold the gear against clockwise rotation, and thus to hold the platform 12 against elevation. Obviously, the gear 16 may rotate in a counter clockwise direction without resistance from the pawl 25.

Thus it will be seen that, when an operator drives a wheel 27 of his vehicle 28 onto the platform 12, the platform will be depressed, against the tendency of the spring 13, to rotate the gear 16 in a counter clockwise direction. The gear 17 will thus be rotated in a clockwise direction and the gear 18 and pinion 18' will be rotated in a counter clockwise direction to lift the barrier 20 into obstructive relation to the wheel 27. When the operator returns to remove his car, a dial embodied in the meter 21 will show him how much money must be deposited in the meter; and, upon deposit of that sum, the lever 23 will be released for manipulation to lift the pawl 25 out of engagement with gear 16. Now, as the vehicle is moved off the platform, the spring 13 will lift the platform to retract the barrier 20.

Figure 2:
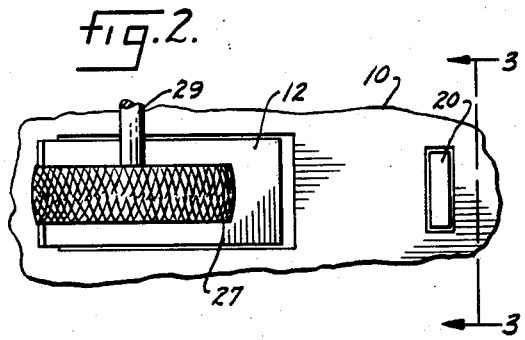
Fig. 2 is a fragmentary plan of the exposed portions of the mechanism of Fig. 1.
Figure 3:
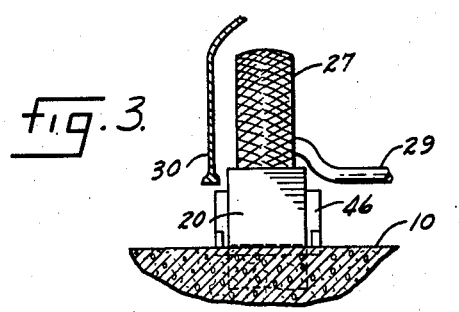
Fig. 3 is a sectional, fragmentary view taken substantially on the line 3—3 of Fig. 2.

In the preferred form of the invention, the barrier will be quite narrow, as is clearly shown in Figs. 2 and 3, so that it will not interfere with the running gear such as the axle 29 of the vehicle, or the fenders 30 thereof, no matter how low the clearance of those elements may be.

If the mechanism were so arranged that actuation of the lever 23 would lift the pawl 25 out of cooperative engagement with the gear 16 and hold the same in inoperative position until the platform 12 was again depressed, it would be possible for dishonest vehicle operators to park their vehicles, deposit a minimum sum, operate the lever to release the gear train, and then leave their vehicles in place until some later time. To guard against this contingency, I have provided means whereby, upon actuation of the lever, the pawl will be moved out of cooperative engagement with the gear and will be held out of such engagement, for a predetermined short period only, whereafter it will be returned to such restraining engagement. As is most clearly shown in Fig. 4, the pawl is carried by a carriage 31 which is mounted for vertical reciprocation in a guideway 32, the lower end of which is located closely adjacent the gear 16 so that, when the carriage 31 is in its lowermost position, the nose 26 of the pawl 25 will engage one of the teeth of the gear 16. Opposite ends of the pawl project from the guideway through slots 33 and 34.

A frame 35 is mounted adjacent the guideway 32 and provides bearings for a shaft 36 which is supported upon a horizontal axis. An arm 37 is fixed to the shaft 36 and is provided with an extension 38 hinged at 39 to the distal end of the arm and normally projecting through the slot 33 into the guideway 32. The hinged connection between the extension 38 and the arm 37 is such as to permit the extension to move freely upwardly out of alignment with the arm but to hold the extension against downward movement out of alignment with the arm.

A spring 40 engaged with the arm 37 resiliently holds said arm against a stop 41, so that the normal position of the arm is horizontal, but said arm may be swung in a clockwise direction against the tendency of the spring 40.

When the lever 23 is manipulated, the carriage 31 will thereby be lifted from its dotted line position of Fig. 4 to a position adjacent the upper end of the guideway 32. As the carriage moves upwardly, it strikes the arm extension 38 and swings the same about its hinge 39; and, as the carriage moves past the distal end of the extension, the extension will return, by gravity, to its solid line position. When the lever 23 is released, the carriage will drop onto the arm extension 38; and the parts are so proportioned and designed that the weight of the carriage 31 will overcome the effect of the spring 40 to swing the arm 37 in a clockwise direction. As the arm is so swung to its dotted line position in Fig. 4, the carriage 31 escapes from the end of the extension 38, the pawl reengages the gear 16, and the spring 40 returns the arm to engagement with the stop 41.

Means is provided for resisting rotation of the shaft 36 under the influence of the weight of the carriage 31 on the arm 37, so that return of the pawl to engagement with the gear 16 is delayed for a preselected period such as three to five minutes. Within that time, an honest vehicle operator can, without undue haste, move his vehicle past the retracted barrier 20.

In the illustrated embodiment of the invention, the means for restraining rotation of the shaft 36 comprises a gear 42 fixed to the shaft 36 and a much smaller gear 43 meshing with the gear 42 and fixed to a second shaft 44 which, in the illustrated embodiment of the invention, has its lower end rotatably supported at the top of a standard 44' and, near its upper end, carries a fan 45 whose rotation is resisted by atmosphere.

Of course, means will preferably be provided for preventing removal of the vehicle by movement away from the barrier 20. Such means may be a wall, a curb, or, as shown, and upturned flange 46 on that end of the platform remote from the barrier 20.

I claim as my invention:

1. An automobile parking station mechanism adapted to be located in a trackway, comprising a vertically movable platform having an upwardly biased spring associated therewith, a vertically movable barrier adjacent said platform, gear means interconnecting said platform and said barrier, latch means operatively associated with said gear means, and latch control means operatively connected to said latch means to effect release of said latch means and permit movement of said barrier in response to appropriate movement of said platform.

2. An automobile parking station mechanism adapted to be located in a trackway, comprising a vertically movable platform positioned to receive and support a wheel of a vehicle, spring means operatively associated with said platform and yieldably resisting downward movement of said platform under the weight of such a wheel, a vertically movable barrier adjacent said platform and disposed, when in elevated position, in the path of a wheel of a vehicle which has a wheel supported on said platform, gear means interconnecting said platform and said barrier to lift said barrier when said platform is depressed and to retract said barrier when said platform is elevated, latch means operatively associated with said gear means and engageable therewith to restrain said barrier against retraction without restraining said barrier against elevation, and latch control means operatively connected to said latch means to effect release of said latch means and render said latch means ineffective to restrain said barrier against retraction.

3. The mechanism of claim 2 including coin-controlled means dominating said latch control means.

4. The mechanism of claim 2 in which said latch control means includes means for automatically returning said latch means to effective engagement with said gear means after a predetermined time lapse following release of said latch means.

5. The mechanism of claim 1 in which said gear means comprises a first rack connected to said platform to move therewith, a second rack connected to said barrier to move therewith, and a distance-multiplying gear train, including a gear meshing with said first rack and a gear meshing with said second rack, to drive said barrier upwardly through a predetermined distance upon descent of said platform through a shorter distance.

6. The mechanism of claim 5 in which said latch means comprises a pawl mounted to engage an element of said gear train to restrain said element against movement in a platform-ascending direction only.

7. The mechanism of claim 6 in which said latch control means is operable to shift said pawl out of engagement with said gear train element, and means activated, upon so shifting said pawl, to return said pawl to such engagement after a predetermined time lapse.

8. The mechanism of claim 1 in which said latch means comprises a member mounted for movement into and out of restraining engagement with an element of said gear means and yieldably urged toward such engagement, said latch control means including coin-controlled means operatively associated with said member and operable to move said member out of such engagement, and other means operatively associated with said member and cooperable therewith, after such movement, to delay for a predetermined time interval the return of said member to such engagement.

9. The mechanism of claim 1 in which said latch means comprises a pawl, a carriage supporting said pawl and guided for downward movement to position said pawl in latching association with said gear means and for upward movement to remove said pawl from such association, said latch control means is operatively connected to said carriage to move the same upwardly so as to remove said pawl, and coin-controlled means dominating said latch-control means.

10. The mechanism of claim 9 including time-delay means mounted to engage said carriage, upon elevation thereof, to delay return of said pawl to such latching association for a predetermined time interval.

11. An automobile parking station mechanism adapted to be located in a trackway, comprising a vertically movable platform having an upwardly biased spring associated therewith, a vertically movable barrier adjacent said platform, gear means interconnecting said platform and said barrier, a vertical guideway having its lower end disposed adjacent an element of said gear means, a carriage reciprocably mounted in said guideway, a pawl carried by said carriage and operatively associated with said gear means element, when said carriage is at the lower end of its travel path, to restrain upward movement of said platform, a shaft mounted adjacent said guideway upon a horizontal axis, an arm fixed to said shaft and having a hinged extension projecting into said guideway substantially midway between the ends of the travel path of said carriage, said extension being movable upwardly, but not downwardly, out of alignment with said arm, spring means operatively associated with said arm to resist downward movement thereof, a gear fixed to said shaft, a second shaft, a smaller gear fixed to said second shaft and meshing with said first-named gear, means operatively associated with said second shaft to resist rotation thereof, and coin-controlled means connected to said carriage and operable to lift said carriage past said arm extension and to deposit the same on said extension.

12. An automobile parking station mechanism adapted to be located in a trackway, comprising a vertically movable platform having an upwardly biased spring associated therewith, a vertically movable barrier adjacent said platform, gear means interconnecting said platform and said barrier, a vertical guideway having its lower end disposed adjacent an element of said gear means, a carriage reciprocably mounted in said guideway, a pawl carried by said carriage and operatively associated with said gear means element, when said carriage is at the lower end of its travel path, to restrain upward movement of said platform, a shaft mounted adjacent said guideway upon a horizontal axis, an arm fixed to said shaft and having a hinged extension projecting into said guideway substantially midway between the ends of the travel path of said carriage, said extension being movable upwardly but not downwardly, out of alignment with said arm, spring means operatively associated with said arm to resist downward movement thereof, means operatively associated with said shaft to resist rotation thereof, and coin-controlled means connected to said carriage and operable to lift said carriage past said arm extension and to deposit the same on said extension.

References Cited in the file of this patent

UNITED STATES PATENTS

| | | |
|---|---|---|
| 1,671,875 | Seitz | May 29, 1928 |
| 2,285,664 | Johnston | June 9, 1942 |
| 2,319,137 | Kitchen | May 11, 1943 |
| 2,588,502 | Dunn | Mar. 11, 1952 |
| 2,702,953 | Heinrich | Mar. 1, 1955 |